United States

Andrews, Jr.

[11] 3,740,116

[51] June 19, 1973

[54] STRENGTH MEMBERS AND STRUCTURAL COMPONENTS INTEGRALLY CONTAINING FIBER OPTIC ELEMENTS

[76] Inventor: Daniel E. Andrews, Jr., 1563 Yost Drive, San Diego, Calif. 92109

[22] Filed: Aug. 27, 1971

[21] Appl. No.: 175,526

[52] U.S. Cl. .............................. 350/96 B, 250/227
[51] Int. Cl. .............................................. G02b 5/16
[58] Field of Search .................. 350/96 B; 250/227

[56] References Cited
UNITED STATES PATENTS

| | | | |
|---|---|---|---|
| 3,207,034 | 9/1965 | Harter | 350/96 B X |
| 3,517,247 | 6/1970 | Szilagyi | 350/96 B X |
| 3,305,689 | 2/1967 | Leavy et al. | 350/96 B UX |
| 3,449,581 | 6/1969 | Rubin | 350/96 B UX |
| 3,136,208 | 6/1964 | Magson | 350/96 B UX |
| 3,417,745 | 12/1968 | Sheldon | 350/96 B X |
| 3,567,407 | 3/1971 | Yoblin | 350/96 B UX |
| 3,644,866 | 1/1971 | Deardurff | 350/96 B UX |

*Primary Examiner*—John K. Corbin
*Attorney*—Richard S. Sciascia, Erwin F. Johnston and Thomas G. Keough

[57] ABSTRACT

A bundle of fiber optic elements functions as the mechanical (usually tensile) load bearing member in telemetry applications calling for the transfer of data between two points. The superior data transfer capabilities of optical fibers, for example, elmiination of crosstalk between adjacent fibers and immunity from ambient electromagnetic interference, are realized by modifying load bearing structures to include the optical fibers. The substantial tensile load bearing capacity of narrow diameter, light weight glass fibers more than adequately supports considerable loads at a fraction of the weight and bulk of a conventional cable. After an electro-optical conversion has been made at one end of the optical fibers, image intensifier or similar devices optionally, are included to further enhance the degree of reliability of the optical radiation representative of data.

7 Claims, 4 Drawing Figures

3,740,116

PATENTED JUN 19 1973

INVENTOR.
DANIEL E. ANDREWS JR.
BY
THOMAS GLENN KEOUGH
ERVIN F. JOHNSTON
ATTORNEYS

STRENGTH MEMBERS AND STRUCTURAL COMPONENTS INTEGRALLY CONTAINING FIBER OPTIC ELEMENTS

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

Frequently, data gathering requires sensors disposed remotely from their monitoring stations or readouts. Such systems must include some sort of a telemetry link for transferring the gathered information. Conventionally, one of the most effective, expedient links is an electrical conductor reaching between the two points. As a consequence of using a conventional copper or similar conductor, the system's weight increases to require additional, weighty structure such as supporting cables to bear the aggregate loads imposed by the conductor and the sensor. A further limitation of using metalic conductors is the creation of capacitive and inductive coupling which causes the generation of "cross-talk" between adjacent conductors when each are carrying discrete trains of data simultaneously. In addition, electronic jamming or spurious electromagnetic radiation degrades the validity of data fed through metalic conductors. Although coaxial cables carrying shielding greatly reduce these problems, coaxial cables further increase the weight of the data transfer link. Another problem confronting designers is the severe tensile stressers that must be borne by the member reaching between a sensor and its monitoring station for example on a towing cable extending from a high speed surface ship to its towed sonar transducer. With the towing ship traveling at speeds in excess of 25 knots and the towed transducer being disposed at depths in excess of 100 feet, the stresses on a conventional towing cable are severe and it must be substantially dimensioned to bear the drag and weight. These conventional cables by being so dimensioned create additional weight and drag as well as posing handling and stowage problems. The contemporary metalic conductors, usually made of copper, do not measurably aid in bearing the load of the towed transducer but create additional weight for the system. In like manner, many hydrodynamic and aerodynamic applications which stand to benefit from having a lightweight tensile load bearing capability having a simultaneous data-transfer capability must contend with the relatively heavy electrical conductors and additional structural members. A need currently exists for a mechanical load-bearing member being capable of transferring substantially undistorted data.

SUMMARY OF THE INVENTION

The invention is directed to providing a member providing structural strength while having a data transfer capability and including a protective envelope containing a plurality of fibers reaching between a pair of securing means holding the fibers in tension. The fibers are formed from a material having a modulus ensuring substantial strength when the tensile forces are exerted between the securing means and the material also has a transparency ensuring the passive guidance of optical radiation representative of data along its length.

It is the prime object of the invention to provide a structural member ensuring strength while additionally serving as a telemetry link.

Another object of the invention is to provide a lightweight data-transfer link included and disposed to ensure structural strength.

Yet another object is to provide a structural data-transfer link insensitive to ambient electromagnetic radiation.

A further object is to provide a structural data-transfer link of light weight.

Still another object is to provide a structural data-transfer link having a reduced susceptibility to mutual electromagnetic coupling.

These and other objects of the invention will become more readily apparent from the ensuing specification when taken with the drawings.

DESCRIPTION OF THE PREFERRED EMBODIMENT

Figure 1:
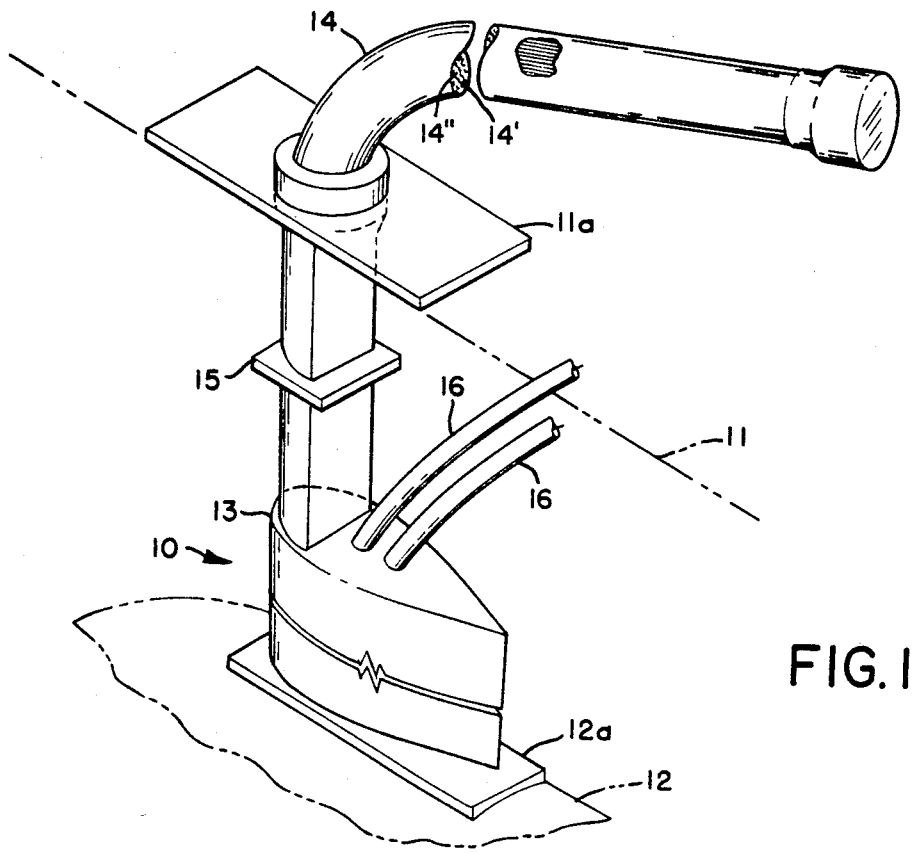
FIG. 1 is an isometric schematic representation of one embodiment of the invention.

Referring now to the drawings, four representative embodiments are depicted and should not be construed as limiting the scope and application of the teachings of the invention. A preferred embodiment takes particular advantage of the invention's strength and telemetry capabilities, namely, when used by high-speed surface ships towing sonar transducers at depth.

A towing cable 10 joins a ship 11 to a transducer 12 via a load-bearing plate 11a carried on the ship and load-bearing plate 12a on the tranducer. In keeping with proven marine design criteria, the cross-sectional configuration of an outer fairing 13 covering the towing cable assumes the shape of a hydrodynamically proven hydrofoil for reducing drag, cavitation, and other flow-related problems. The fairing's interior is large enough to contain strength and data transfer elements, to be elaborated on below, and the remaining space, if any, optionally is hollow, solid, fluid filled or honeycombed.

A bundle of fiber-optic elements 14 is housed in and secured to both load-bearing plates. A combined bonding and clamping action at the plates, in accordance with accepted methods of securing optical fibers so as not to interfere with their degree of internal optical reflection, maintains the suspended cable in tension yet allows an undistorted data transfer.

The advantages of using fiber-optic elements as telemetry links between a sensor and monitoring circuitry are appreciated widely by physicists and electronic designers. Their use is often called for when spurious electromagnetic radiation must be kept from the telemetry system since the optical fibers do not act as elongate antennas as do unshielded metalic conductors. A further advantage of employing fibers having a suitable cladding is the elimination of cross-talk frequently encountered in multichannel systems equipped with unsheilded adjacent metalic conductors.

Recent advances in fiber-optics technology have made feasible optical fibers for data transmission reaching in excess of several hundred feet in length. Due to higher degrees of purification of the glass and improved methods of uniformly applying a cladding of lower refractive index over a glass core, a markedly improved longitudinal reflection of the incident light result with reduced losses. Thus, within the current state of the art, optical fibers are fabricated which transmit bursts of light representative of data for hundreds of feet.

An analog signal representative of impinging acoustic energy is generated by transducer 13 and is converted to a pulse code by a compact quantizer and digitalizer mounted in the tranducer housing. The pulse-code signal is fed to a bank of light-emitting diodes or similar devices responsive to electrical impulses to produce representative bursts of radiation, and a series of light pulses is generated and fed through the fiber optics to the surface monitoring station. Analog-to-digital-to-optical signal conversion circuits are widely known and inclusion of specific examples is dispensed with to avoid belaboring the obvious.

The power enabling the signal conversion process is fed to the transducer by a pair of electrical conductors 16 adding only a relatively small weight to the towing cable when compared to a conventional wire-rope supported arrangement. Naturally, if the transducer housing is provided with a suitable self-contained power source, the electrical conductors are eliminated.

Greater reliability is provided for by mounting a conventional image intensifier or light repeater schematically shown by block 15 along the reaches of the optical fibers.

One of the most impressive characteristics of optical fibers not heretofore exploited, is their great tensile strength modulus especially as the fibers are made smaller and smaller in diameter. It is a well known fact that although glass in a chunk does not possess an overly impressive tensile strength, as molten glass is drawn into small diameter fibers its tensile strength increases at a nearly exponential rate. For example, a typical soda-lime-silicate glass, appropriately purified and drawn into fibers having composite core-plus-cladding diameters measuring less than 100 microns, has a tensile strength as high as 500,000 PSI. Obviously, a bundle of such fibers has a substantial load-bearing capacity at only a fraction of the weight and bulk of a wire rope having an identical capacity. Although it is recognized that when employing optical fibers performing the dual role of being a data-transmission link and a load-bearing member, microscopic cracks consequently form along the skin of individual optical fibers to reduce their data transfer capability and strength. But by having a sufficiently thick layer of cladding, the original strength of the fiber is maintained and it serves to further isolate the light carried in the core from the outside at a cost of only slightly increasing the fiber's diameter.

The reduction in weight afforded by using optical fibers is considerable. In most cases, the huge data capacity of a bundle of fibers in unnecessary and redundancy in transmission channels is includable to enhance reliability. Alternately, some of the glass fibers 14' solely function as the load bearing members or reinforcing members while their adjacent fibers serve as the data links or act as links passing command signals to the transducer. In any event, the weight reduction is significant.

Optionally, a bonding agent 14'' also is added to hold the load bearing fibers and the data transmitting fibers in one package ensuring increased mutual protection from damage caused by twisting or turning as the towing cable slices through the water.

From the embodiment of FIG. 1, it is seen that a significant reduction in the weight of the towing cable results from advantageously applying the tensile load bearing capabilities of fiber optics to allow their functioning as the structural members and additionally using selected ones or the entire bunch as a data transfer link.

Figure 2:
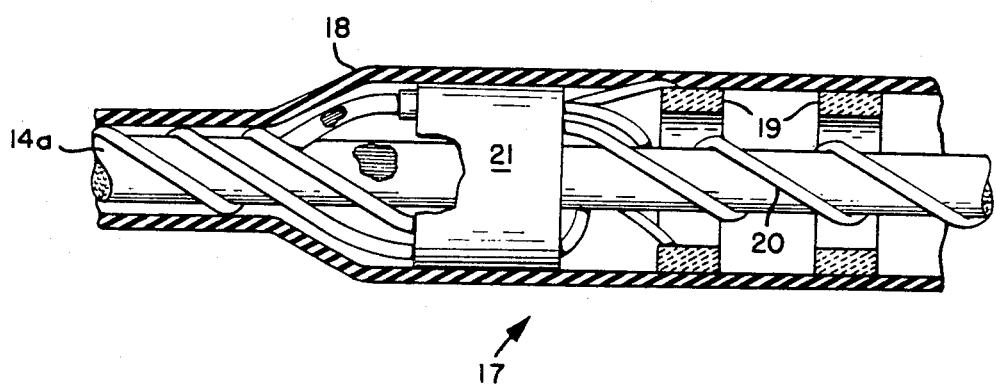
FIG. 2 is a cross-sectional schematic representation of another embodiment of the invention.

A similar arrangement for providing lightweight tensile support to a sensor is shown in FIG. 2. In this embodiment a section of a towed sonar array 17 is drawn through the water by a fiber-optic bundle 14a. An elastic protective casing 18 is stretched over a plurality of ring-shaped ferroelectric transducer elements 19 for providing signals representative of impinging acoustic energy. Appropriately connected electrical conductors 20 reach to a cylindrically shaped electro-optical converter 21 which generates bursts of radiation, in a manner outlined above, and couples them to fiber-optic bundle 14a. Here again, the fiber-optic bundle consists of load-bearing-data-transmitting fibers alone, or a combination of data-transmitting fibers juxtaposed with other fibers designed for bearing the load.

Figure 3:
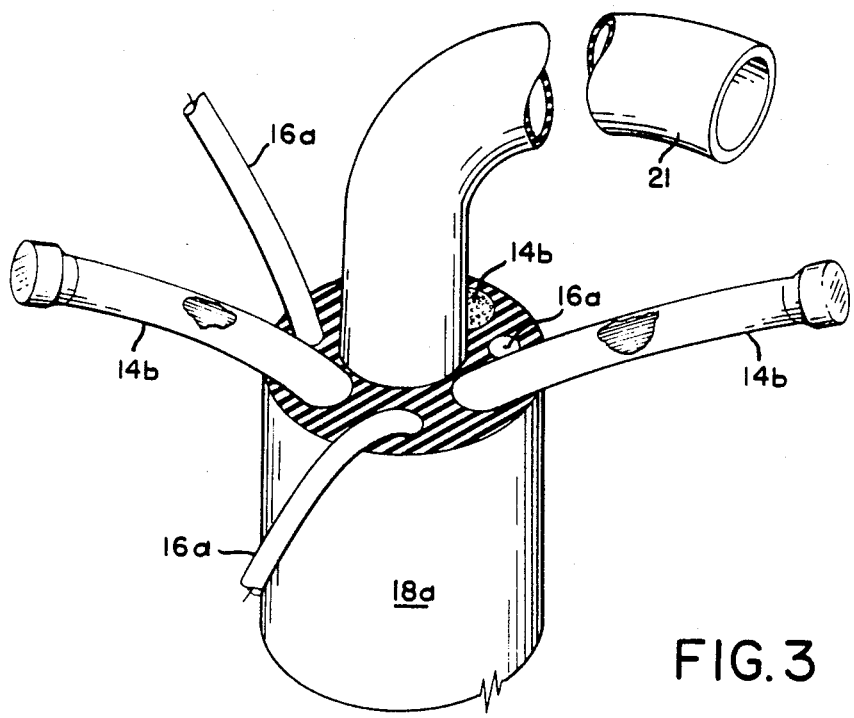
FIG. 3 is an isometric schematic representation of yet another application of the invention.
Figure 4:
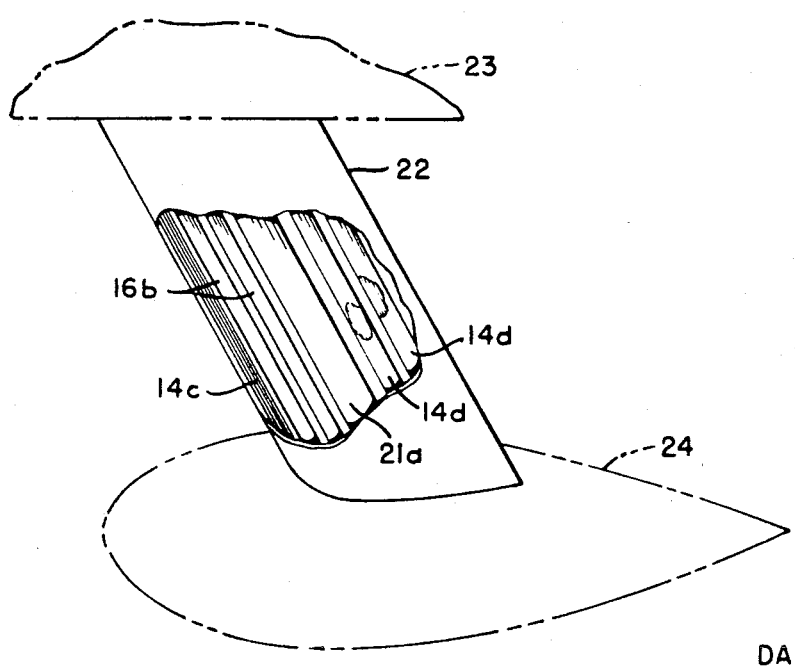
FIG. 4 shows inclusion of the invention in a rigid strut subjected to longitudinal and torsional forces.

Thus far, inclusion of the optical fibers has been discussed with respect to towed sonars or similar applications where drag and weight must be borne and data transferred. Noting the embodiment of FIG. 3, bundles of optical fibers 14b are bonded into a tube-like casing 18a for their disclosed purpose and additionally provide the support for electrical power lines and conduits for the transport of fluids. A single, relatively large, life-support conduit 21 for passing air, for example, to a habitat is shown in the figure along with electrical cables 16a. The conduit and power cables, while being nonstructural components and, if extending for a distance, create a dead weight needing considerable support by the optical fibers.

In still another embodiment of the invention, the dual load bearing-data transmitting capabilities of the fiber optics are advantageously employed in rigid structural elements, there being depicted a hydrofoil strut 22 reaching between a control platform 23 and a submerged pod 24. Here, the strut is made of glass-reinforced-plastic which receives at least part of its reinforcement from the optical fibers 14c. Additionally, a strut is modified to include optical rods 14d serving to provide bearing strength while passing data signals, and electrical conductors 16b and a conduit 21a are included to function in their disclosed manner.

Since prestressing gives a structural member significantly more strength without a proportional increase in weight, the lightweight optical fibers optionally are prestressed to make their inclusion in airframes and airfoils, where weight is a problem, a more attractive proposition.

Obviously, many modifications and variations of the present invention are possible in the light of the above teachings, and, it is therefore understood that within the scope of the disclosed inventive concept, the invention may be practiced otherwise than specifically described.

What is claimed is:

1. A member providing structural strength while having a data-transfer capability comprising:
 a protective envelope having a cross-sectional configuration designed to reduce hydrodynamic drag;
 a first and a second securing means each disposed at opposite longitudinal extremes, the first being carried on a high-speed towing platform and the second being connected to a towed sensor to exert a tensile force; and
 a bundle of glass fiber-optic elements held between said first and said second securing means formed from a material having a modulus for ensuring tensile strength for towing said sensor when tensile forces are exerted between said first and said second securing means and having a transparency ensuring the passive guidance of optical radiation representative of said data;
 electrical conductors disposed in said protective envelope juxtaposed with said fiber-optic elements providing illuminating and other power to said sensor allowing the generation of said data; and
 reinforcing elements disposed in said protective envelope juxtaposed with said fiber-optic elements for increasing said structural strength.

2. A member providing structural strength while having a data-transfer capability comprising:
 means forming a protective envelope having a cross-sectional configuration designed to reduce hydrodynamic drag;
 a first and a second securing means each carried on a high-speed towing platform and a towed sensor, respectively, and disposed at opposite longitudinal extremes of said protective envelope;
 a plurality of elements held between said first and said second securing means, each of said elements is formed from a material having a modulus ensuring said structural strength when a composite force including torsional and bearing stresses are exerted between both said securing means and having a transparency ensuring the passive guidance of optical radiation representative of said data;
 electrical conductors disposed in said protective envelope juxtaposed with said elements providing illumination and other power to said sensor allowing the generation of said data; and
 reinforcing elements disposed in said protective envelope juxtaposed with said elements for increasing said structural strength.

3. A member providing structural strength while having a data-transfer capability extending from a towing platform to a towed sensor comprising:
 means forming an elongate protective envelope having a cross-sectional configuration designed to reduce hydrodynamic drag;
 a first securing means disposed at one end of said elongate protective envelope and mounted on said towing platform;
 a second securing means disposed on the other end of said elongate protective envelope and mounted on said towed sensor; and
 a bundle of fiber optics interconnecting said first securing means and said second securing means having a modulus for bearing the severe tensile load created as said towed sensor is pulled through the water and having a transparency ensuring the passive guidance of optical radiation representative of data, said bundle of fiber optics is operatively disposed in said elongate protective envelope to serve as the primary load bearing element.

4. An elongate towing cable according to claim 3 in which a self-contained source of electrical power is carried in said towed sensor for providing said optical radiation.

5. An elongate towing cable according to claim 4 further including:
 means for intensifying said optical radiation interposed between said first securing means and said second securing means and coupled to said bundle of glass fiber optic elements for ensuring the passing of said data.

6. A member providing structural strength while having a data-transfer capability reaching from a marine habitat to a support vessel comprising:
 means forming an elongate protective envelope being resistant to the effects of a marine environment;
 a first securing means disposed at one end of said elongate protective envelope and connected to said marine habitat;
 a second securing means disposed at the other end of said elongate protective envelope and connected to said support vessel;
 at least one life-support conduit joining said supprt vessel to said marine habitat and passing a fluid therebetween and disposed in said protective envelope to occupy a substantial volume therein; and
 a bundle of glass fiber-optic elements disposed in said elongate protective envelope and held between said first and said second securing means formed from a material having a modulus for ensuring tensile strength for bearing the weight of said life-support conduit, said fluid, and said elongate protective envelope and having a transparency ensuring the passive guidance of optical radiation representative of data.

7. An elongate life-support conduit according to claim 6 further including:
 means for intensifying said optical radiation joined to said bundle of glass fiber-optic elements for ensuring the passing of said data.

* * * * *